2,818,396

DEXTRAN AND DRYING OIL FATTY ACIDS-MODIFIED POLYESTERS AND METHOD OF PRODUCING THE POLYESTERS

Elwood P. Wenzelberger, Dayton, Ohio, assignor to The Commonwealth Engineering Company of Ohio, Dayton, Ohio, a corporation of Ohio No Drawing. Application January 7, 1955
Serial No. 480,586

23 Claims. (Cl. 260—9)

This invention relates to new polyester resins. More particularly, it relates to resins comprising dextran- and drying oil acids-modified polyesters.

Modified polyesters formed by interaction of an unsaturated polycarboxylic acid or functional derivative thereof, a polyhydric alcohol and dextran have certain important advantages, including the advantage that the dextran functions as a co-reacted constituent of the polyester and, to the extent of the proportion thereof present, to decrease the thermosetting property which is an inherent characteristic of polyester resins.

Usually it is found that polyester or alkyd resins are settable in ultimate hardened condition in a commercially feasible time by curing or baking at elevated temperatures. The dextran-modified polyesters, on the other hand, are on the borderline between thermoplastic and thermosetting and may be hardened expeditiously by either heating or cooling, which appreciably extends their usefulness. Depending on the alcohol component, the dextran-modified polyester may exhibit either more pronounced thermosetting or more pronounced thermoplastic property.

Those polyesters of which the alcohol component is glycerol or other alcohol of more than two hydroxyl groups are more definitely thermosetting and may be more expeditiously hardened by heating, while those the alcohol component of which is a dihydric alcohol like ethylene glycol are more definitely thermoplastic and more expeditiously hardened by cooling. In general, the dextran-modified polyesters may be cooled and reheated more often, without ultimate hardening, than can polyesters that are not modified by co-reaction with dextran.

It is now found that dextran-modified polyesters also modified by a drying oil fatty acid have certain advantages for use in the manufacture of varnishes and enamels and for the production of films which harden on cooling or heating to form tough, hard, durable coatings having good adhesion to metal and resistance to mineral spirits, e. g., gasoline and to aqueous soap and alkali solutions.

Unsaturated polycarboxylic acids which may be used in producing the polyester include maleic, fumaric, phthalic, chlormaleic, chlorfumaric, citraconic, methylethyl maleic, diethyl maleic, chloromethyl maleic and mesaconic acids, and the acid anhydrides.

Polyhydric alcohols that may be used include ethylene glycol, di-, tri or tetramethylene glycol, propylene glycol, dipropylene glycol, glycerol and pentaerythritol.

The dextran may be the native high molecular weight polysaccharide biosynthesized from sucrose by the action of dextran-producing microorganisms such as those of the *Leuconostoc mesenteroides* and *L. dextranicum* types, or their enzymes, or it may be a partial hydrolyzate of the native material. As is known, the properties of the dextran, such as the molecular structural repeating 1,6 to non-1,6 linkages ratios and water-sensitivity are determined by the microorganism used to effect the biosynthesis. The dextran may have a 1,6 to non-1,6 linkages ratio of 1.9:1 to 30:1, form stable aqueous solutions or dispersions of 0.5% to 50% concentration, and have a molecular weight between 2000 and that of native, microbiologically produced dextran. Microorganisms which may be used to synthesize the dextran include, for example, those bearing the following NRRL (Northern Regional Research Laboratory) designations: *Leuconostoc mesenteroides* B–512, B–119, B–1146, B–1190, B–742, B–1191, B–1208, B–1216, B–1120, B–1144, B–523; *Streptobacterium dextranicum* B–1254 and *Betabacterium vermiforme* B–1139.

Mixtures of the unsaturated polycarboxylic acids or their derivatives, mixtures of polyhydric alcohols, and mixtures of different dextrans may be used.

Any drying oil fatty acid or mixture of drying oil fatty acids containing conjugated or non-conjugated olefinic linkages may be used in preparing the new compositions. Examples of suitable drying oil acids are linseed oil fatty acids, dehydrated castor oil fatty acids, tung oil fatty acids, perilla oil fatty acids, oiticia oil fatty acids, and fish oil fatty acids such as sardine oil fatty acids or menhaden oil fatty acids. Mixtures of these fatty acids or mixtures of highly conjugated drying oil fatty acids and non-conjugated semi-drying oil fatty acids, such as a mixture of equal parts by weight tung oil fatty acids and soybean oil fatty acids may also be used. The drying oil fatty acids are obtained by saponification of the corresponding drying oils, or by steam hydrolysis of the oils, and are available commercially.

The new compositions may be obtained by heating the reactants together, for example at temperatures of 50° C. to 300° C. until a substantially homogeneous viscous resinous liquid is obtained. This product may be cooled and then re-heated to fluid condition and even hardened and, optionally, granulated or powdered prior to use.

The relative proportions of the polyester-forming components may be varied and either the polycarboxylic acid or polyhydric alcohol may predominate, the dextran and drying oil being used, generally, in relatively minor amounts. In general, the compositions are obtained by heating to the polyester-forming temperature a mixture of, by weight, 30 to 65% of the polycarboxylic acid or anhydride thereof, from 15% to 50% of the polyhydric alcohol, from 5% to 20% of the dextran, and from 5% to 20% of the drying oil acids, the total of the ingredients equalling 100. The components may be mixed together initially, or the dextran, or a portion thereof, may be dissolved or dispersed in the polyhydric alcohol with heating, and the hot solution or dispersion added to the liquid acid or anhydride either before or after mixing in of the drying oil acids. In some instances, it may be preferred to heat the dextran, acid or anhydride and alcohol to reaction temperature and then add the drying oil acid. Or the dextran, acid or anhydride, and drying oil fatty acid or mixture of such acids may be heated to reaction temperature and the resulting product further heated with the polyhydric alcohol. The order of mixing and heating of the reactants in producing the dextran and fatty acid modified polyesters is not regarded as critical. The heating may be carried out in an atmosphere of an inert gas.

The reaction may be expedited by inclusion of a catalyst. Suitable catalysts include ozone, ozonides, inorganic super oxides such as barium peroxide, sodium peroxide, etc., aliphatic acyl peroxides, e. g., acetyl peroxide, lauryl peroxide, stearyl peroxide, etc., peroxides of the aromatic acid series such as benzoyl peroxide, p-chlorobenzoyl peroxide, etc., mixed organic peroxides such as acetyl benzoyl peroxide, ketone peroxides of the type of acetone peroxide, triacetone peroxide, alkyl derivatives of hydrogen peroxide including ethyl hydrogen peroxide, diethyl peroxide, various per compounds such as perborates, persulfates, perchlorates, etc., aluminum salts such as the halides, e. g., aluminum chloride. The catalyst may be used in a concentration of 0.1% to 1.5% by weight of the total charge.

Varnish driers may be included, such as cobalt naphthenate, lead oxide, lead octonate, etc. These additives may be used in amounts of 0.1% to 1.5% or even higher by weight.

The following examples are illustrative of specific embodiments of the invention, it being understood that these examples are not limitative.

*Example I*

About 14.3 parts of particulate B-512 dextran (average M. W. about 30,000) are dissolved in 30.4 parts of hot glycerol, and the hot solution is added to 40.3 parts of melted maleic anhydride containing 15.0 parts of fatty acids of dehydrated castor oil. The mass is boiled for 10 to 45 minutes with continued stirring. On cooling, the product hardens to a clear, light amber resinous substance which can be granulated and then re-heated to fluid condition prior to use.

The resin is used in a varnish obtained by dissolving one part of the resin in a mixture of two parts of mineral spirits (an aliphatic hydrocarbon varnish solvent) and one part of xylene, and adding as driers 0.02% cobalt, 0.005% manganese and 0.15% lead naphthenates. Films of this varnish are clear and hard and adhere strongly to metal.

*Example II*

About 11.6 parts of particulate native L. m. B-523 dextran are dissolved in 42 parts of hot ethylene glycol and the hot solution is added to 30.4 parts of melted phthalic anhydride containing 16 parts of linseed oil fatty acids. The mass is boiled for 15 minutes with continued stirring. On cooling, the product sets to a clear, amber resin which can be re-heated to fluid condition prior to use.

A varnish is prepared from this resin in the manner described in Example I, and forms films which on air drying are hard, durable and resistant to mineral spirits and alkali solutions.

Other of the fatty oil acids and mixtures thereof, and other polycarboxylic acids, polyhydric alcohols and dextrans may be co-reacted to provide resins of properties and uses essentially equivalent to those exemplified.

Dyes, pigments and special effect materials such as metallic particles may be incorporated in the polyester compositions, as desired.

It may also be desirable to include a polymerization inhibitor in the composition. Antoxidants such as hydroquinone, pyrogallol, tannic acid or any aromatic amine such as aniline or phenylene diamine may be employed as the inhibitor, in amounts between 0.01% and 0.02% on the composition weight.

Other applications of the principle of the invention may be employed instead of those specifically described, such changes and variations being within the invention which is not to be limited except as defined in the appended claims.

What is claimed is:

1. A resinous material produced by mixing together, by weight, 30% to 65% of a substance selected from the group consisting of unsaturated polycarboxylic acids and anhydrides thereof, 15% to 50% of a polyhydric alcohol, 5% to 20% of dextran, and 5% to 20% of a drying oil fatty acid containing a plurality of ethylenic bonds, and then heating the mixture at a temperature between 50° C. and 300° C. until a fluid resinous reaction product of the ingredients is obtained.

2. A resinous material produced by mixing together, by weight, 30% to 65% of maleic anhydride, 15% to 50% of a polyhydric alcohol, 5% to 20% of dextran, and 5% to 20% of a drying oil fatty acid containing a plurality of ethylenic bonds, and then heating the mixture at a temperature between 50° C. and 300° C. until a fluid, resinous reaction product of the ingredients is obtained.

3. A resinous material produced by mixing together, by weight, 30% to 65% of phthalic anhydride, 15% to 50% of a polyhydric alcohol, 5% to 20% of dextran and 5% to 20% of a drying oil fatty acid containing a plurality of ethylenic bonds, and heating the mixture at a temperature between 50° C. and 300° C. until a fluid, resinous reaction product of the ingredients is obtained.

4. A resinous material produced by mixing together, by weight, 30% to 65% of maleic anhydride, 15% to 50% of glycerol, 5% to 20% of dextran, and 5% to 20% of dehydrated castor oil fatty acids, and then heating the mixture at a temperature between 50° C. and 300° C. until a fluid, resinous reaction product of the ingredients is obtained.

5. A resinous material produced by mixing together, by weight, 30% to 65% of phthalic anhydride, 15% to 50% of ethylene glycol, 5% to 20% of dextran, and 5% to 20% of linseed oil fatty acids, and then heating the mixture at a temperature between 50° C. and 300° C. until a fluid, resinous reaction product of the ingredients is obtained.

6. A resinous material produced by mixing together, by weight, 30% to 65% of a substance selected from the group consisting of unsaturated polycarboxylic acids and anhydrides thereof, 15% to 50% of a polyhydric alcohol, 5% to 20% of dextran, and 5% to 20% of tung oil fatty acids, and then heating the mixture at a temperature between 50° C. and 300° C. until a fluid, resinous reaction product of the ingredients is obtained.

7. A resinous material produced by mixing together, by weight, 30% to 65% of a substance selected from the group consisting of unsaturated polycarboxylic acids and anhydrides thereof, 15% to 50% of a polyhydric alcohol, 5% to 20% of dextran, and 5% to 20% of dehydrated castor oil fatty acids, and then heating the mixture at a temperature between 50° C. and 300° C. until a fluid resinous reaction product of the ingredients is obtained.

8. A resinous material produced by mixing together, by weight, 30% to 65% of a substance selected from the group consisting of unsaturated polycarboxylic acids and anhydrides thereof, 15% to 50% of a polyhydric alcohol, 5% to 20% of dextran, and 5% to 20% of linseed oil fatty acids, and then heating the mixture at a temperature between 50° C. and 300° C. until a fluid, resinous reaction product of the ingredients is obtained.

9. A resinous material produced by mixing together, by weight, 30% to 65% of a substance selected from the group consisting of unsaturated polycarboxylic acids and anhydrides thereof, 15% to 50% of a polyhydric alcohol, 5% to 20% of dextran, and 5% to 20% of a mixture of drying and semi-drying oil fatty acids containing a plurality of ethylenic bonds, and then heating the mixture at a temperature between 50° C. and 300° C. until a fluid, resinous reaction product of the ingredients is obtained.

10. A resinous material produced by heating, by weight, 30% to 65% of a substance selected from the group consisting of unsaturated polycarboxylic acids and anhydrides thereof, 15% to 50% of a polyhydric alcohol, and 5% to 20% of dextran together at a temperature between 50° C. and 300° C. until a fluid, resinous reaction product of the ingredients is obtained, said product also containing 5% to 20% of a drying oil fatty acid containing a plurality of ethylenic bonds.

11. A resinous material produced by heating, by weight, 30% to 65% of maleic anhydride, 15% to 50% of a polyhydric alcohol, and 5% to 20% of dextran together at a temperature between 50° C. and 300° C. until a fluid resinous reaction product of the ingredients is obtained, said product also containing 5% to 20% of a drying oil fatty acid containing a plurality of ethylenic bonds.

12. A resinous material produced by heating, by weight,

30% to 65% of phthalic anhydride, 15% to 50% of a polyhydric alcohol, and 5% to 20% of dextran together at a temperature between 50° C. and 300° C. until a fluid, resinous reaction product of the ingredients is obtained, said products also containing a drying oil fatty acid containing a plurality of ethylenic bonds.

13. A resinous material produced by heating, by weight, 30% to 65% of maleic anhydride, 15% to 50% of glycerol, and 5% to 20% of dextran together at a temperature between 50° C. and 300° C. until a fluid, resinous reaction product of the ingredients is obtained, said product also containing 5% to 20% of dehydrated castor oil fatty acids.

14. A resinous material produced by heating, by weight, 30% to 65% of phthalic anhydride, 15% to 50% of ethylene glycol, and 5% to 20% of linseed oil fatty acids, together at a temperature between 50° C. and 300° C. until a fluid, resinous reaction product of the ingredients is obtained, said product also containing 5% to 20% of linseed oil fatty acids.

15. A resinous material produced by heating, by weight, 30% to 65% of a substance selected from the group consisting of unsaturated polycarboxylic acids and anhydrides thereof, 15% to 50% of a polyhydric alcohol, and 5% to 20% of dextran, together at a temperature between 50° C. and 300° C. until a fluid, resinous reaction product of the ingredients is obtained, said product also containing 5% to 20% of tung oil fatty acids.

16. A resinous material produced by heating, by weight, 30% to 65% of a substance selected from the group consisting of unsaturated polycarboxylic acids and anhydrides thereof, 15% to 50% of a polyhydric alcohol, and 5% to 20% of dextran, together at a temperature between 50° C. and 300° C. until a fluid, resinous reaction product of the ingredients is obtained, said product also containing 5% to 20% of dehydrated castor oil fatty acids.

17. A resinous material produced by heating, by weight, 30% to 65% of a substance selected from the group consisting of unsaturated polycarboxylic acids and anhydrides thereof, 15% to 50% of a polyhydric alcohol, and 5% to 20% of dextran, together at a temperature between 50° C. and 300° C. until a fluid, resinous reaction product of the ingredients is obtained, said product also containing 5% to 20% of linseed oil fatty acids.

18. A resinous material produced by heating, by weight, 30% to 65% of a substance selected from the group consisting of unsaturated polycarboxylic acids and anhydrides thereof, 15% to 50% of a polyhydric alcohol, and 5% to 20% of dextran, together at a temperature between 50° C. and 300° C. until a fluid, resinous reaction product of the ingredients is obtained, said product also containing 5% to 20% of a mixture of drying and semi-drying oil fatty acids containing a plurality of ethylenic bonds.

19. The method of making a modified polyester resin which comprises mixing together, by weight, 30% to 65% of a substance selected from the group consisting of unsaturated polycarboxylic acids and anhydrides thereof, 15% to 50% of a polyhydric alcohol, 5% to 20% of dextran, and 5% to 20% of drying oil fatty acids containing a plurality of ethylenic bonds, and heating the mixture at a temperature between 50° C. and 300° C. until a fluid, resinous reaction product of the ingredients is obtained.

20. The method of making a modified polyester resin which comprises mixing together, by weight, 30% to 65% of maleic anhydride, 15% to 50% of glycerol, 5% to 20% of dextran, and 5% to 20% of drying oil fatty acids containing a plurality of ethylenic bonds, and heating the mixture at a temperature between 50° C. and 300° C. until a fluid, resinous reaction product of the ingredients is obtained.

21. The method of making a modified polyester resin which comprises mixing together, by weight, 30% to 65% of phthalic anhydride, 15% to 50% of ethylene glycol, 5% to 20% of dextran, and 5% to 20% of drying oil fatty acids containing a plurality of ethylenic bonds, and heating the mixture at a temperature between 50° C. and 300° C. until a fluid, resinous reaction product of the ingredients is obtained.

22. The method of making a modified polyester resin which comprises mixing together, by weight, 30% to 65% of maleic anhydride, 15% to 50% of glycerol, 5% to 20% of dextran, and 5% to 20% of dehydrated castor oil fatty acids, and heating the mixture at a temperature between 50° C. and 300° C. until a fluid, resinous reaction product of the ingredients is obtained.

23. The method of making a modified polyester resin which comprises mixing together, by weight, 30% to 65% of phthalic anhydride, 15% to 50% of ethylene glycol, 5% to 20% of dextran, and 5% to 20% of linseed oil fatty acids, and heating the mixture at a temperature between 50° C. and 300° C. until a fluid, resinous reaction product of the ingredients is obtained.

References Cited in the file of this patent
UNITED STATES PATENTS

| | | |
|---|---|---|
| 1,108,329 | Callahan | Aug. 25, 1914 |
| 1,893,873 | Kienle | Jan. 10, 1933 |
| 2,255,313 | Ellis | Sept. 9, 1941 |
| 2,624,768 | Toulmin | Jan. 6, 1953 |